US010659590B2

(12) United States Patent
Massinissa Magini

(10) Patent No.: US 10,659,590 B2
(45) Date of Patent: May 19, 2020

(54) ELECTRONIC SYSTEM FOR INDIRECT INTERCOMMUNICATION MESSAGING BETWEEN ELECTRONIC TERMINALS

(71) Applicant: TSB S.R.L., Fabriano (IT)

(72) Inventor: Paolo Massinissa Magini, Fabriano (IT)

(73) Assignee: TSB S.R.L., Fabriano (AN) (IT)

( * ) Notice: Subject to any disclaimer, the term of this patent is extended or adjusted under 35 U.S.C. 154(b) by 360 days.

(21) Appl. No.: 15/518,196

(22) PCT Filed: Oct. 14, 2015

(86) PCT No.: PCT/IB2015/057869
§ 371 (c)(1),
(2) Date: Apr. 10, 2017

(87) PCT Pub. No.: WO2016/059570
PCT Pub. Date: Apr. 21, 2016

(65) Prior Publication Data
US 2017/0302781 A1    Oct. 19, 2017

(30) Foreign Application Priority Data

Oct. 14, 2014  (IT) .............................. MI2014A1785

(51) Int. Cl.
*H04M 1/725*   (2006.01)
*H04M 3/42*    (2006.01)
*H04L 29/08*   (2006.01)

(52) U.S. Cl.
CPC .... *H04M 1/72552* (2013.01); *H04L 67/1044* (2013.01); *H04L 67/1046* (2013.01);
(Continued)

(58) Field of Classification Search
CPC ......... H04M 1/72552; H04M 3/42008; H04M 2203/6081; H04L 67/1046; H04L 67/1044; H04L 67/306
See application file for complete search history.

(56) References Cited

U.S. PATENT DOCUMENTS

2002/0090911 A1   7/2002  Evans et al.
2005/0048961 A1*  3/2005  Ribaudo ........... H04M 3/42348
                                                           455/419
(Continued)

OTHER PUBLICATIONS

International Search Report and Written Opinion dated Jan. 20, 2016, issued in PCT Application No. PCT/IB2015/057869, filed Oct. 14, 2015.

*Primary Examiner* — Austin J Moreau
(74) *Attorney, Agent, or Firm* — Workman Nydegger

(57) ABSTRACT

An electronic system for indirect intercommunication messaging includes at least one central processing unit acting as a server, and one or more user terminals adapted to be bidirectionally connected to the central processing unit, wherein each one of the user terminals includes components for preparing and sending to the central processing unit a request for contact with another one of the user terminals, the contact request including data relating to at least one interaction genre and to the identification of the other user terminal; components for receiving and displaying a contact request sent by the central processing unit and coming from another one of the user terminals; the central processing unit includes components for receiving and storing the contact requests coming from each one of the user terminals; comparing the data contained in the contact requests; sending to a pair of the terminals the requests for contact with the other terminal of the pair only if and when coincidence is verified between the interaction genre data of the contact requests and the terminals have been mutually identified, so (Continued)

that the contact between the pair of terminals can only be activated upon the coincidence verification.

16 Claims, 5 Drawing Sheets

(52) U.S. Cl.
CPC ...... *H04L 67/306* (2013.01); *H04M 3/42008* (2013.01); *H04M 2203/6081* (2013.01)

(56) References Cited

U.S. PATENT DOCUMENTS

| | | |
|---|---|---|
| 2007/0162569 A1 | 7/2007 | Robinson et al. |
| 2008/0051033 A1* | 2/2008 | Hymes .............. H04L 29/12103 455/47 |
| 2008/0147743 A1* | 6/2008 | Taylor .................... G06Q 30/02 |
| 2010/0180211 A1* | 7/2010 | Boyd ..................... G06Q 10/10 715/751 |
| 2013/0335509 A1 | 12/2013 | Cafferata |
| 2015/0370898 A1* | 12/2015 | Ahmed ................ G06F 16/951 707/706 |

* cited by examiner

ELECTRONIC SYSTEM FOR INDIRECT INTERCOMMUNICATION MESSAGING BETWEEN ELECTRONIC TERMINALS

FIELD OF THE INVENTION

The present invention relates to an electronic system for indirect intercommunication messaging between electronic terminals, of the type that uses a remote messaging program or service through a data processing centre acting as a server.

BACKGROUND ART

Interpersonal communication via electronic remote messaging systems is continually and exponentially gaining importance, having now become the reference system for communication.

For example, messaging systems of a first type promote direct communication between individuals or groups. The most famous ones are: WhatsApp®, Hangout®, BlackBerry Messenger®, Telegram®.

Other system types are adapted to foster direct communications between individuals or groups through Internet sites dedicated to meetings between people for forming couples, where each individual enters elements that describe him/herself and explicitly proposes him/herself to other individuals, typically unknown persons, while being protected by anonymity, which ensures depersonalization and no emotional involvement in case of a refusal.

These Internet sites for fostering meetings between people for forming couples support couple formation by statistically studying compatible profiles and suggesting possible associations, e.g., by pairing personalities or, generally speaking, compatibilities. Some examples of this kind of services are: Badoo®, Match®, Zoosk®, Meetic®.

Other systems give people who do not know each other the opportunity of joining a community with the same purposes (e.g., making an appointment), allowing them to show something about their lives (e.g., photographs, experiences, preferences), and offering them the possibility of holding a dialogue, commonly called "chatting".

Other types of systems also offer the service of recommending matches between profiles which are considered to be compatible with each other on the basis of profile evaluation algorithms. The association between different intentions relies, first of all, on the construction of the user profile (e.g., by means of photographs and data describing the person), and then on the conversations ("chats") between individuals.

Some examples of systems adapted to allow interpersonal communication are also found in the patent literature, e.g., in patent applications US2002/0090911-A1; US2007/0162569-A1 and US2013/0335509-A1.

The system described in US2002/0090911-A1 can create contacts between persons who do not know each other, so that communications can be established between individuals having mutual affinities. Affinity mutuality is determined by an algorithm based on characteristics declared by the users (who may even make false statements, whether consciously or unconsciously, if their perception of themselves is not aligned with reality).

The system described in US2007/0162569-A1 allows users to browse the list of the users who have registered into the system and to expressly request for the possibility of communicating with known or unknown persons, all this occurring anonymously, with the possibility of putting the communication on stand-by and then resuming it.

Said known systems suffer from common technical shortcomings because they cannot provide the users with technical means for ensuring intention matching between individuals, since no technical means are available for putting only into indirect contact two individuals who know each other, perhaps only visually, and share the same interests, but do not want to communicate directly due to various difficulties, even emotional ones, while ensuring anonymity for contact with strangers.

The messaging systems known in the art utilize technological means for data transmission, data encryption, transport of information other than just text (images, audio, video) and representation thereof (displaying images and playing sounds), but they do not provide technical support for determining data relating to perfect intention matches between sender and receiver. The search for such matches is carried out manually by the very individuals who are communicating with each other, e.g., as described in US2002/0090911-A1.

The known systems adapted to provide a technical basis for fostering meetings between people are used by individuals who, in most cases, do not know each other and would be embarrassed if they did. These systems also offer meeting proposals on the basis of computations made by sophisticated but statistical algorithms, where the matching probability may be high (if the algorithm is an advanced one and the profiles are rich in information), but will never be certain.

The systems known in the art do not allow, therefore, a communicative relationship to be established between individuals having a common genre of interest but not wanting to be directly identified.

Moreover, the systems known in the art do not ensure confidentiality of the communication between said individuals.

This leads to the technical problem of providing the users with an electronic system that allows establishing a communication automatically, as opposed to manually, and in privacy, only after indirect initial contact and identification.

SUMMARY OF THE INVENTION

It is therefore one object of the present invention to propose an electronic system for indirect intercommunication messaging between electronic terminals, of the type that uses a remote messaging program or service through a data processing centre acting as a server, which is aimed at overcoming all of the above-mentioned drawbacks.

One object of the invention is to provide technical means for ensuring a form of indirect contact between individuals, conditional upon verification of the mutual will of establishing it, which mutual will does not refer to contact per se, but to contact with only one specific individual.

The present invention relates to an electronic system for indirect intercommunication messaging, which comprises at least one central processing unit acting as a server, and one or more user terminals adapted to be bidirectionally connected to said central processing unit, wherein:

each one of said user terminals comprises:

means for preparing and sending to said central processing unit a request for contact with another one of said user terminals, said contact request comprising data relating to at least one interaction genre and to the identification of said other terminal;

means for receiving and displaying a contact request sent by said central processing unit and coming from another one of said user terminals;

said central processing unit comprises means for:
receiving and storing said contact requests coming from each one of said user terminals;
comparing said data contained in said contact requests;
sending to a pair of said terminals said requests for contact with the other terminal of the pair only if and when coincidence is verified between the interaction genre of the contact requests and the terminals have been mutually identified, so that said contact between said pair of terminals can only be activated upon said coincidence verification.

It is a particular object of the present invention to provide an electronic system for indirect intercommunication messaging system and a user terminal adapted for use in said system as set out in the claims, which are an integral part of the present description.

It is a further object of the present invention to provide a method of indirect intercommunication messaging between user terminals, which are advantageously bidirectionally connected to a central processing unit, as set out in the claims, which are an integral part of the present description.

BRIEF DESCRIPTION OF THE DRAWINGS

Further objects and advantages of the present invention will become apparent from the following detailed description of a preferred embodiment (and variants) thereof referring to the annexed drawings, which are only supplied by way of non-limiting example, wherein.

DETAILED DESCRIPTION OF SOME EMBODIMENTS OF THE INVENTION

The electronic system of the invention comprises a central processing unit SR acting as a server (hereafter defined as server), to which one or more user terminals registered in the system are bidirectionally connected, e.g., through the Internet network.

Figure 1:
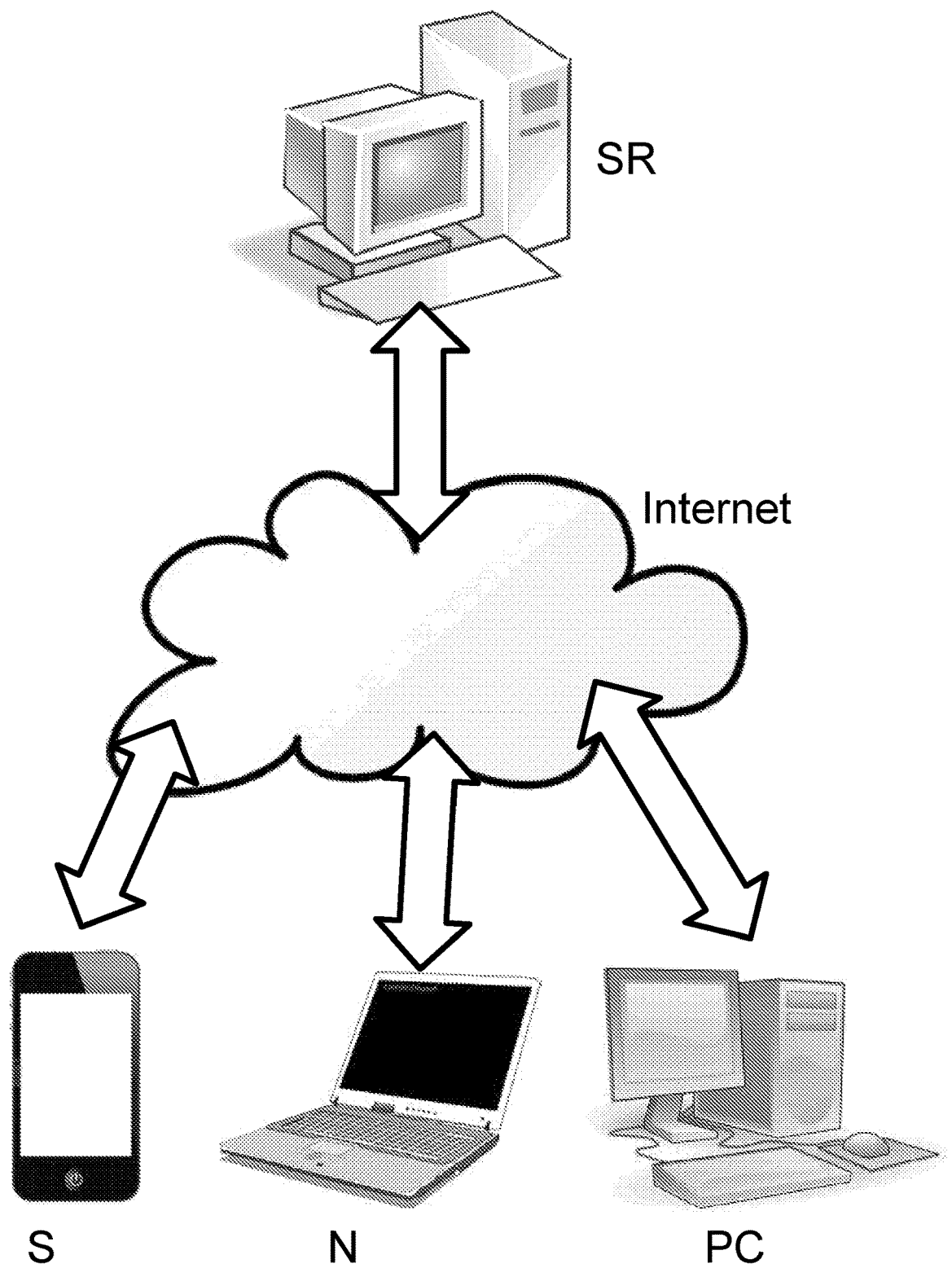
FIG. 1 is a general diagram of the electronic system according to the present invention.

With reference to FIG. 1, the user terminals may be, for example, portable ones, e.g., Smartphones S, or Tablets T, or Netbooks N, or desktop terminals, e.g., PCs, or equivalent terminals capable of handling software applications also allowing users to connect to the Internet.

The server SR may be an electronic system of any type known in the art, adapted for this purpose and provided with Internet connection capability.

The functions carried out by the electronic system are the following.

A user terminal, defined as sender, sends to the server a request for contact (hereafter referred to as INTERACTION proposal) with another user terminal, defined as receiver, indicating certain preferences that will be described below.

The server will not immediately send to the receiver a notification relating to the INTERACTION proposal received from the sender; instead, it will send the INTERACTION proposal to the receiver only if and when also the receiver (who does not know the sender's intentions) will show the same desire for INTERACTION with the sender, by sending to the system an equivalent INTERACTION proposal.

Therefore, only if and when the system verifies the matching of the INTERACTION proposals, it will allow the exchange of such proposals between the sender and the receiver.

Figure 2:
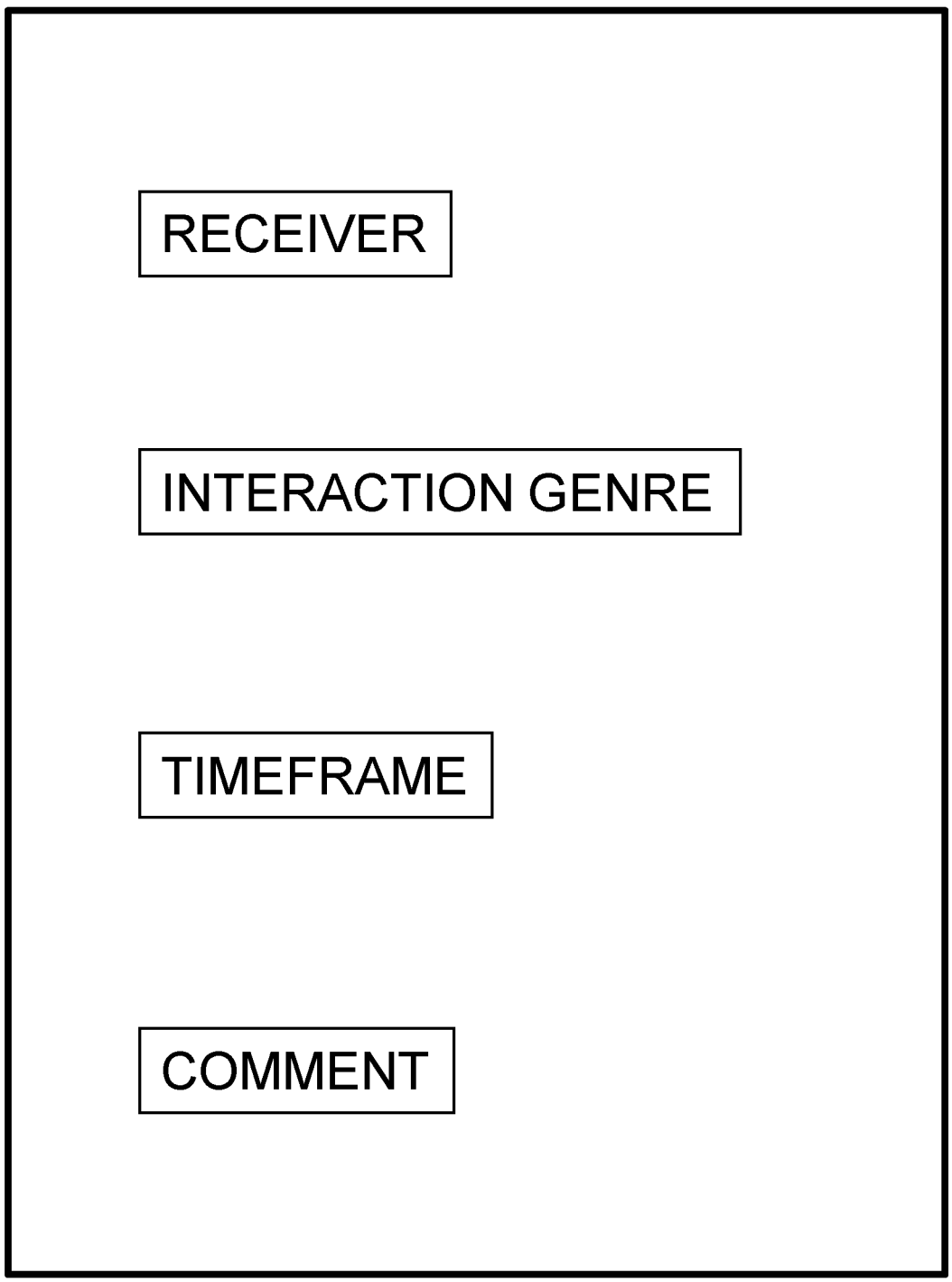
FIGS. 2 and 3 show some examples of screenshots that are displayed on the user terminals when the system is in use.
Figure 3:
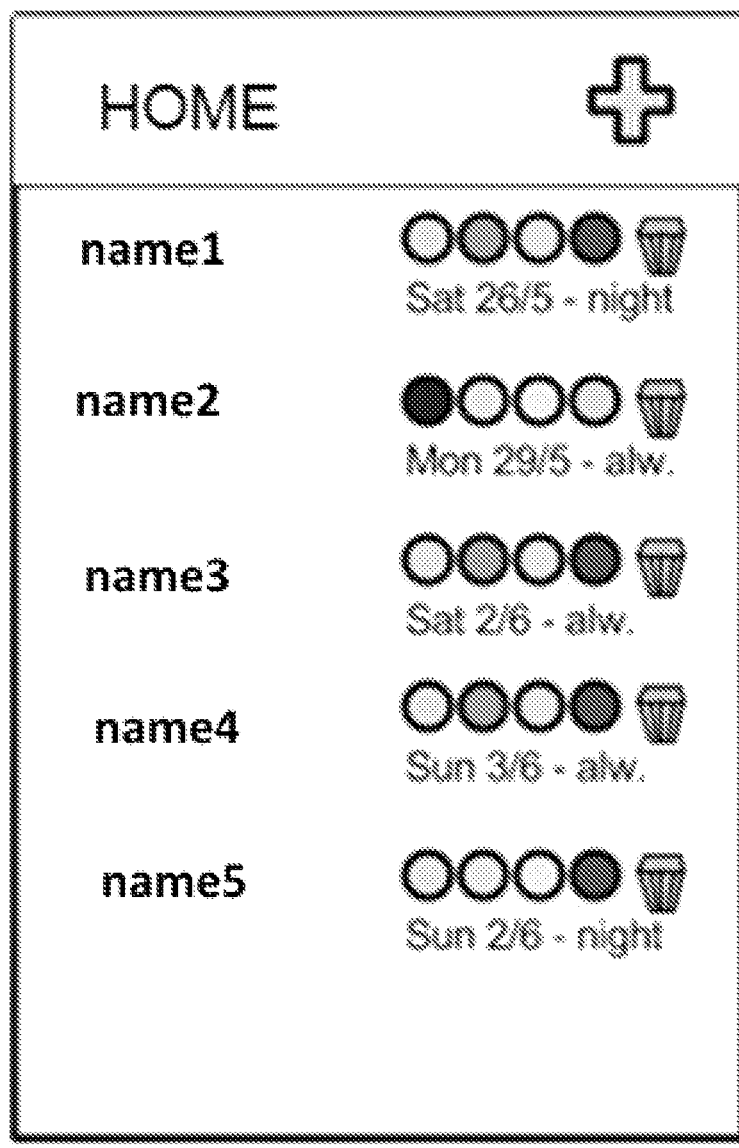

The sender user prepares an INTERACTION proposal on his/her terminal by using a screen, e.g., like the one schematized in FIGS. 2 and 3, in which he/she enters the following type of data.

He/she chooses the sender from a drop-down list of registered users;

He/she then indicates the INTERACTION GENRE, e.g., represented by data relating to predefined SYMBOLS or COLORS, or by specific references to interaction events or places;

Instead of selecting the receiver from a drop-down list of registered users, the user registers beforehand to the event, so that the system will assign him/her a temporary identifier (a nickname, e.g., a number), which will only be valid for the duration of the event.

It is also possible to add a free text comment, which may include information about the interaction event or place; if the interaction genres (and possibly also the timeframes) match, the free text comment will be mutually displayed, and from then on other messages can be mutually exchanged.

The sender then sends the INTERACTION proposal thus prepared to the server.

The server stores all INTERACTION proposals it receives from the various connected terminals, and compares them as aforesaid in order to decide if and when to make the corresponding exchanges between the terminals.

Following the exchange of the INTERACTION proposals, the involved users can apply the interaction subject.

As a consequence, the INTERACTION request can be removed.

The following will describe some more detailed examples of the types of data that form the INTERACTION proposals.

As far as the INTERACTION GENRE is concerned, it can be schematized by means of a predefined SYMBOL or COLOR representative of categories of interactions, possibly hierarchized ones, assigned beforehand to the different INTERACTION GENRES.

For example, the INTERACTION may be classified into three GENRES:
1. (green) desire for non-exclusive INTERACTION (A wants to spend some time with B, also together with other people);
2. (light blue) desire for exclusive INTERACTION, with no sentimental implications (A wants to spend some time alone with B);
3. (red) desire for exclusive INTERACTION with sentimental implications (A wants to spend some time alone with B because A feels sentimentally attracted to B).

The sender A may also express multiple INTERACTION GENRES at the same time for the same receiver B, and the sender A may, for the same timeframe, express the same INTERACTION GENRE for several potential receivers, provided that his/her simultaneous interaction requests are compatible with one another.

The GENRES category may be hierarchized even further; for example, the "non-exclusive INTERACTION" GENRE may be further modulated into: Sports, Culture, Recreation, Gastronomy, etc., by adding further predefined SYMBOLS or COLORS.

A screen like the one schematized in FIGS. 2 and 3 can be used on the user terminal also for displaying an INTERACTION proposal sent by the system, in the case of a receiver user, only if and when coincidence has been verified by the system between that INTERACTION proposal and the one previously sent by the same user as a sender.

Figure 4:
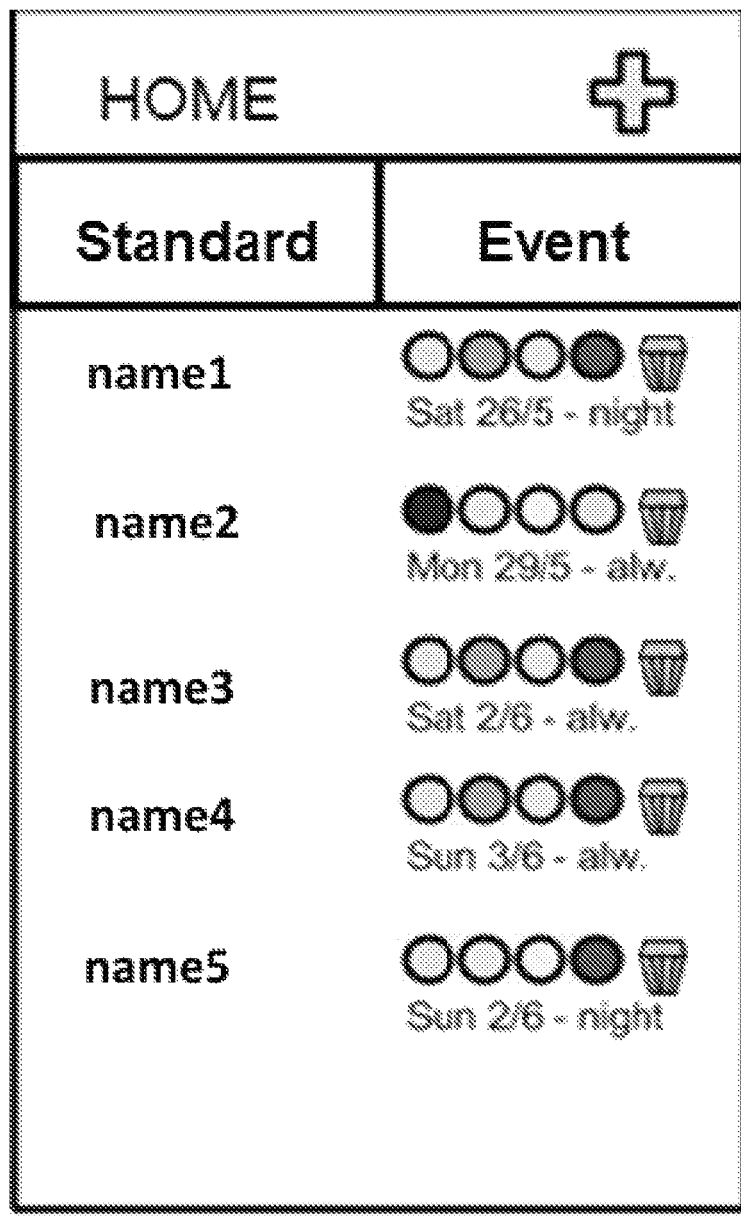
FIGS. 4 and 5 show some examples of screenshot variants that are displayed on the user terminals when the system is in use.
Figure 5:
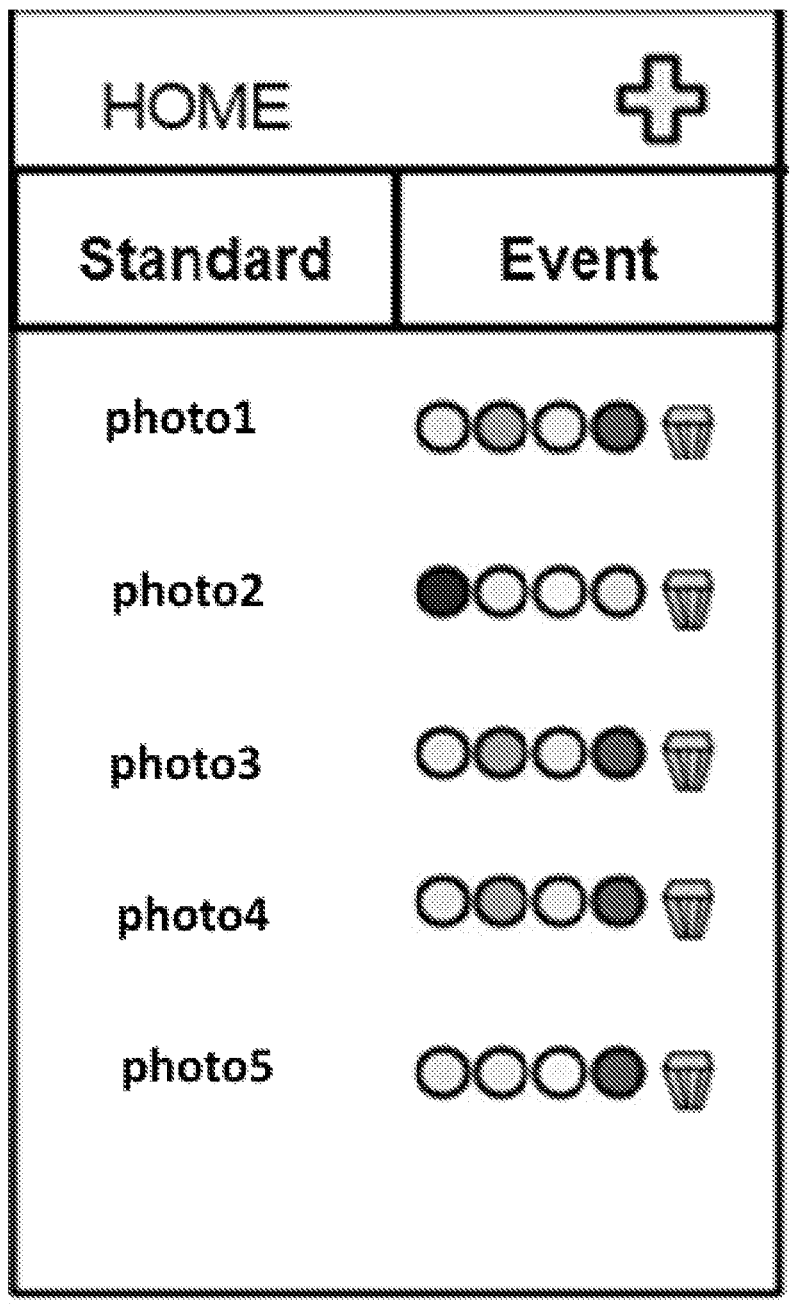

In a variant of the invention, the sender user has at his/her disposal screens like those schematized in FIGS. 4 and 5, which, compared to the one shown in FIG. 3, allow choosing between two types of interaction with other users: a first "Standard" type (FIG. 4), as described above, and a second "Event" type (FIG. 5).

The second type allows the user to interact with other persons within the scope of an event in which he/she is participating, e.g. in a public place.

Instead of selecting the receiver from a drop-down list of registered users, the user registers beforehand to the event, so that the system will assign him/her a temporary identifier (a nickname, e.g. a number), which will only be valid for the duration of the event.

The system will prepare a list of registered users participating in the event, indicating the respective temporary identifiers assigned to them. Each one of said users will be allowed to display on his/her own terminal the list of all the registered people participating in the event, along with their respective temporary identifiers, possibly complemented with further data, such as a photograph, of course with no names.

The list will be displayed on the terminal of the user when the latter sends his/her temporary identifier to the system.

The user will then send to the system the temporary identifier of the other registered user participating in the event, and the interaction to be established with him/her (said interaction is always expressed as a simple code, whether a color or a shape or any other symbol). If the other user performs the same actions as well, by sending the temporary identifier of the first user to the system and by expressing the desire for the same interaction with that user, then the system will put the two users in contact with each other. The rest of the "Event" type procedure follows the same steps as the "Standard" type procedure.

Although the "Event" type of interaction has been described above in combination with the "Standard" type of interaction, it must be pointed out that the "Event" type of interaction may exist autonomously. In such a case, the system of the invention will make available to the user only the "Event" screen (and not the "Standard" screen).

From the above description of the "Event" type of interaction it can be appreciated that it shares the same inventive concept as the "Standard" type of interaction, and therefore it also falls (just like the "Standard" type of interaction) within the protection scope of the present invention.

The user terminals of the system comprise means for executing all of the above-described operations both as a sender user and as a receiver user.

The method of indirect intercommunication messaging of the invention can advantageously be implemented by means of software applications adapted to handle communications between the user terminals and the server. The following will describe some non-limiting examples of embodiment of said software applications, consisting of a part to be installed in each user terminal and a part to be installed in the server.

One example of an object-based programming language that can be used for creating the user-side application is Java with the Android® operating system, while Objective-C® or Swift® may be used for Apple® devices, based on iOS®.

As far as the server-side software part is concerned, some examples of programming languages may consist of a "traditional" solution, with an architecture based on a MySQL® or PostgreSQL® database (in the OpenSource world) and a programming language such as Java® or PhP®, or, preferably, a "cloud" solution with an architecture relying on Google App Engine®, still using the Java® or Python® programming language.

One functional example of a user-side application is the following. The application implements some basic functions, including system registration, and functions for managing INTERACTION proposals.

A) Basic Functions of the User-Side Application.

The first function is registration to the service on the server.

Acceptance of the terms of use (privacy, etc.) is followed by the transmission of information for composing the user profile.

If the profile information is incomplete or is not accepted, the application will prompt to enter such information (otherwise the execution will stop).

If the previous step is completed successfully, a process will be started for synchronizing the phone numbers of the contacts listed in the user's phone book with the server.

The phone numbers registered on the server and coinciding with those in the user's phone book will receive a notification stating that the user has joined the community making use of the service.

The application will update the phone numbers on the server, keeping them synchronized with those in the mobile phone; therefore, the application will create a list of its own, representing the intersection between the user's list and his/her contacts who have installed the application.

It follows that the user may advantageously be recognized within the system through verification of the mobile phone number.

A menu for choosing further functions will then be displayed, like the following;
  "Legal" opens a text of legal notations (disclaimer, privacy, Open Source License, etc.);
  "Help" opens a help text explaining the operation of the application from both a "mechanical" viewpoint (what the keys do) and a "strategic" viewpoint (how to make the best use of it);
  "News & Statistics" opens a screen with several notification rows (e.g., "your contact <Nickname> has activated the application"). The statistics will show some information about the requests entered into the system or about any (anonymous) requests possibly present for the user;
  "Setting" opens a screen with various setup functions, like the following. When a function is selected, a corresponding screen will open:
  Account: name (or nickname), phone number, email address.
  Status: the user may enter a mood he/she is in (or leave it blank)
  Photograph: an image representing the user.
  If the user uninstalls the application or changes terminal, at the next installation (after having accepted the terms of use and having registered the mobile phone number) the server will restore the contents of those messages which have not yet expired; old messages and specific settings will not be restored.

B) Functions for Managing INTERACTION Proposals of the User-Side Application.
  "Home function"—displays a screen (FIG. 3) showing a series of rows, as many as the number of existing interaction requests addressed to the user, sent and updated by the server. The subjects of the requests, included in such rows, will appear under their respective (nick)names, possibly also with the indication of the interaction timeframe. When a row is selected, the "Request entry function" will appear, pre-filled with information about that contact. The "Request entry function" is also accessible by pressing a button (indicated as + in FIG. 3) for entering a new interaction request.

"Request entry function"—a screen is displayed where interaction requests can be entered, as already described with reference to FIG. 2. Further examples of basic interaction types are the following, characterized by colored buttons that can be activated:
(green) Interaction alone or in the presence of other people;
(light blue) Exclusive interaction between two persons, but without sentimental implications;
(red) Interaction with sentimental implications.

Multiple buttons can be activated for one interaction request.

C) Basic Functions of the Server-Side Application.

The server handles the users' registrations to the service.

It also manages the synchronization of the phone numbers of the contacts listed in the user's phone book.

The server-side application reads the whole user's phone book and copies the phone numbers into a table ("Friendships"). Then the server will search for those contacts of the user who have already been registered (this is shown in the Users table), marking them with "Yes" and sending such information to the user application; during the same transaction, the server will search for those users who already have the new user among their own relationships, change the Registered flag to "Yes" and send this information to the application upon the first access of the user.

Every time a user updates/adds/removes a contact into/from his/her own phone book, the user application will send a message to the server, and the server will update the status of the ("Friendships") table. Every time a new mobile phone number is added, the server will make the above-described verifications.

Should a user delete his/her own account, the server will delete all instances of that user from all tables, without however notifying the other users; nevertheless, it will update the phone books to avoid that a user might enter an interaction request towards a deleted user.

Also on the server side there is a buffer for updating the disconnected mobile phone numbers.

D) Functions for Managing INTERACTION Proposals of the Server-Side Application.

"Request entry"—When a user enters an interaction request, the server will save the request but, in defense of the users' privacy, it will not immediately verify the compatibility of the INTERACTION proposals. As a matter of fact, should it immediately respond to the request, the person who entered the request would know that the counterpart has already entered a request before him/her, and this might give him/her information that the other user might not want to give. The request will be processed within a timeframe that will become the shorter the closer the date of expiry of the interaction request.

"Request fulfillment"—Periodically, at random time intervals (e.g., after a time t1=10' since the request was entered, and within a time t2=30'), the server verifies the pairing conditions between the INTERACTION requests of the various users, cross-referencing the parameters thereof.

For each cross-reference, it will be defined if the result is positive (there is a pairing=ok) or not (no compatible interests=x). In case of pairing, the server will also indicate to both users the interaction level in common, if multiple INTERACTION GENRES have been expressed as defined above; in fact, the simplest case is when both users express the same simple interaction (pairing verified on that level). The case of multiple identical interactions is slightly more complex; the program will indicate a pairing on a more "intimate" level of interaction. In case of multiple different interactions, the program will assign a pairing (if possible) on the most "intimate" compatible level. As far as the timeframe is concerned, the server will indicate the most restrictive one (e.g., for "always" and "night", the result will be "night").

The server will periodically delete from the archive the expired requests that have not been fulfilled.

The method of the present invention can advantageously be implemented through computer programs comprising coding means for implementing one or more steps of the method, when such programs are executed by computers. It is therefore understood that the protection scope extends to said computer programs as well as to computer-readable means that comprise recorded messages, said computer-readable means comprising program coding means for implementing one or more steps of the method, when said programs are executed by a computer.

In a per se known manner, the man skilled in the art can choose among several programming language alternatives for implementing the above-described software procedures, as already mentioned: on the user terminal side, for example, the Java® (version 8), SDK Android® Studio (version 22) languages, for the Android® operating system; or Objective C, SQL®, for the operating system of Apple mobile phones. For the central processing unit (server side), instead, e.g., based on Linux technology, the Go (language for Google App Engine), SQL®, Java®, PHP®, C, Bash® languages.

The above-described non-limiting example of embodiment may be subject to variations without departing from the protection scope of the present invention, including all equivalent designs known to a man skilled in the art.

The elements and features shown in the various preferred embodiments may be combined together without however departing from the protection scope of the present invention.

The advantages deriving from the application of the present invention are apparent.

It solves the technical problems of providing the users with an electronic system that allows establishing a communication automatically, as opposed to manually, and in privacy and mutuality of intentions, only after indirect initial contact and identification. The method according to the present invention allows, in fact, putting in communication two persons who don't know each other, but mutually choose each other (in the "EVENT" version they necessarily know each other by sight) and have a common genre of interest, in a wholly confidential manner only known to such two persons. Between two persons "A" and "B" already knowing each other, the method according to the invention ensures that the person "A" may invite the person "B" for a certain type of interaction, being sure that, IF and ONLY IF also "B" has the same desire, then said identicalness of interests will be revealed to those two persons. Otherwise, the person "B" will never know the intention of the person "A" towards him/her.

From the above description, those skilled in the art will be able to produce the object of the invention without introducing any further hardware or software details.

It must finally be underlined that the method according to the present invention can be implemented both through dedicated applications and through dedicated accessory modules prearranged for integrating social media such as, for example, Facebook® or LinkedIn®. As a mere non-limiting example, an accessory module of Facebook® according to the present invention allows sending, in addition to a traditional "explicit" friend request (wherein the receiver is notified of the friend request and may accept it or not), also a "confidential" friend request. In such a case, the Facebook® server will receive and hold a user's friend request towards a receiver, but the receiver will not be notified. If the receiver in turn sends a "confidential" friend request (or even an "explicit" friend request) to that user, then the Facebook® server will notify both persons of the bond of friendship established between them.

The invention claimed is:

1. An electronic system for indirect intercommunication messaging, comprising:
    at least one central processing unit acting as a server, and one or more user terminals adapted to be bidirectionally connected to said central processing unit, wherein:
    each one of said user terminals includes a processor and is configured to:
        prepare and send to said central processing unit a request for contact with another one of said user terminals, said contact request comprising data relating to at least one interaction genre and to an identification of said other user terminal;
        receive and display a contact request sent by said central processing unit and coming from another one of said user terminals;
    said central processing unit includes a processor and is configured to:
        receive and store said contact requests coming from each one of said user terminals;
        compare said data contained in said contact requests;
        send to a pair of said user terminals said contact requests with the other user terminal of the pair only if and when coincidence is verified between the interaction genre data of the contact requests and the user terminals have been mutually identified, so that said contact between said pair of user terminals can only be activated upon said coincidence verification,
    wherein said at least one interaction genre is represented by data relating to predetermined SYMBOLS or COLORS representative of categories of interactions; and
    wherein the interaction is one among a non-exclusive interaction, an exclusive interaction with no sentimental implications and an exclusive interaction with sentimental implications.

2. The electronic system for indirect intercommunication messaging according to claim 1, wherein said contact request comprises data relating to a time identifier of the interaction place or event assigned for the occasion to the other user terminal.

3. The electronic system for indirect intercommunication messaging according to claim 1, wherein the predetermined SYMBOLS or COLORS representative of categories of interactions, include hierarchized ones and are supplemented with specific references to interaction events or places.

4. The electronic system for indirect intercommunication messaging according to claim 1, wherein said identification data of said other user terminal comprises identification data of a user, whether in clear form or as a temporary identification nickname.

5. The electronic system for indirect intercommunication messaging according to claim 1, wherein each one of said user terminals is also configured to execute operations for registering and building a user profile to be sent to said central processing unit.

6. The electronic system for indirect intercommunication messaging according to claim 1, wherein said contact request further comprises data relating to an interaction timeframe, and wherein said central processing unit sends to a pair of said user terminals said requests for contact with the other user terminal of the pair only if and when coincidence is verified between the interaction genre data and between the interaction timeframe data.

7. A user terminal adapted for use in a system according to claim 6, wherein said request comprises data relating to: identification of the other terminal and at least one interaction genre.

8. A user terminal adapted for use in a system according to claim 1, wherein said request comprises data relating to: identification of the other terminal and at least one interaction genre.

9. The electronic system of claim 1, wherein contact between the pair of user terminals can be initiated by a request from one of the pair of user terminals independent of, and without the need for, the other of the pair of user terminals to also request such contact between the pair of user terminals be established.

10. A method of indirect intercommunication messaging between user terminals bidirectionally connected to a central processing unit, the method comprising the steps of:
    by each one of said user terminals:
        preparing and sending to said central processing unit a request for contact with another one of said user terminals, said contact request comprising data relating to at least one interaction genre and to the identification of said other user terminal;
        receiving and displaying a contact request sent by said central processing unit and coming from another one of said user terminals;
    by said central processing unit:
        receiving and storing said contact requests coming from each one of said user terminals;
        comparing said data contained in said contact requests;
        sending to a pair of said user terminals said requests for contact with the other user terminal of the pair only if and when coincidence is verified between the interaction genre data of the contact requests and the user terminals have been mutually identified, so that said contact between said pair of user terminals can only be activated upon said coincidence verification,
    wherein said at least one interaction genre is represented by data relating to predetermined SYMBOLS or COLORS representative of categories of interactions; and
    wherein the interaction genre is one among a non-exclusive interaction, an exclusive interaction with no sentimental implications and an exclusive interaction with sentimental implications.

11. The method of indirect intercommunication messaging according to claim 10, wherein said contact request comprises data relating to a time identifier of the interaction place or event assigned for the occasion to the other user terminal.

12. The method of indirect intercommunication messaging according to claim 10, wherein said SYMBOLS or COLORS representative of categories of interactions include hierarchized ones and are supplemented with specific references to interaction events or places.

13. The method of indirect intercommunication messaging according to claim 10, wherein said identification data of said other user terminal comprise identification data of a user, whether in clear form or as a temporary identification nickname.

14. The method of indirect intercommunication messaging according to claim 10, wherein each one of said user terminals executes operations for registering and building a user profile to be sent to said central processing unit.

15. The method of indirect intercommunication messaging according to claim 10, wherein said contact request further comprises data relating to an interaction timeframe, and wherein said central processing unit sends to a pair of said user terminals said requests for contact with the other user terminal of the pair only if and when coincidence is verified between the interaction genre data and between the interaction timeframe data.

16. A non-transitory computer-readable means comprising a recorded program, said computer-readable means comprising program coding means adapted to implement the steps of claim 10 when said recorded program is executed on a computer.

* * * * *